May 14, 1968 C. N. FRENCH ETAL 3,382,957
POWER BRAKE SERVOMOTOR
Filed Feb. 14, 1966 2 Sheets-Sheet 2
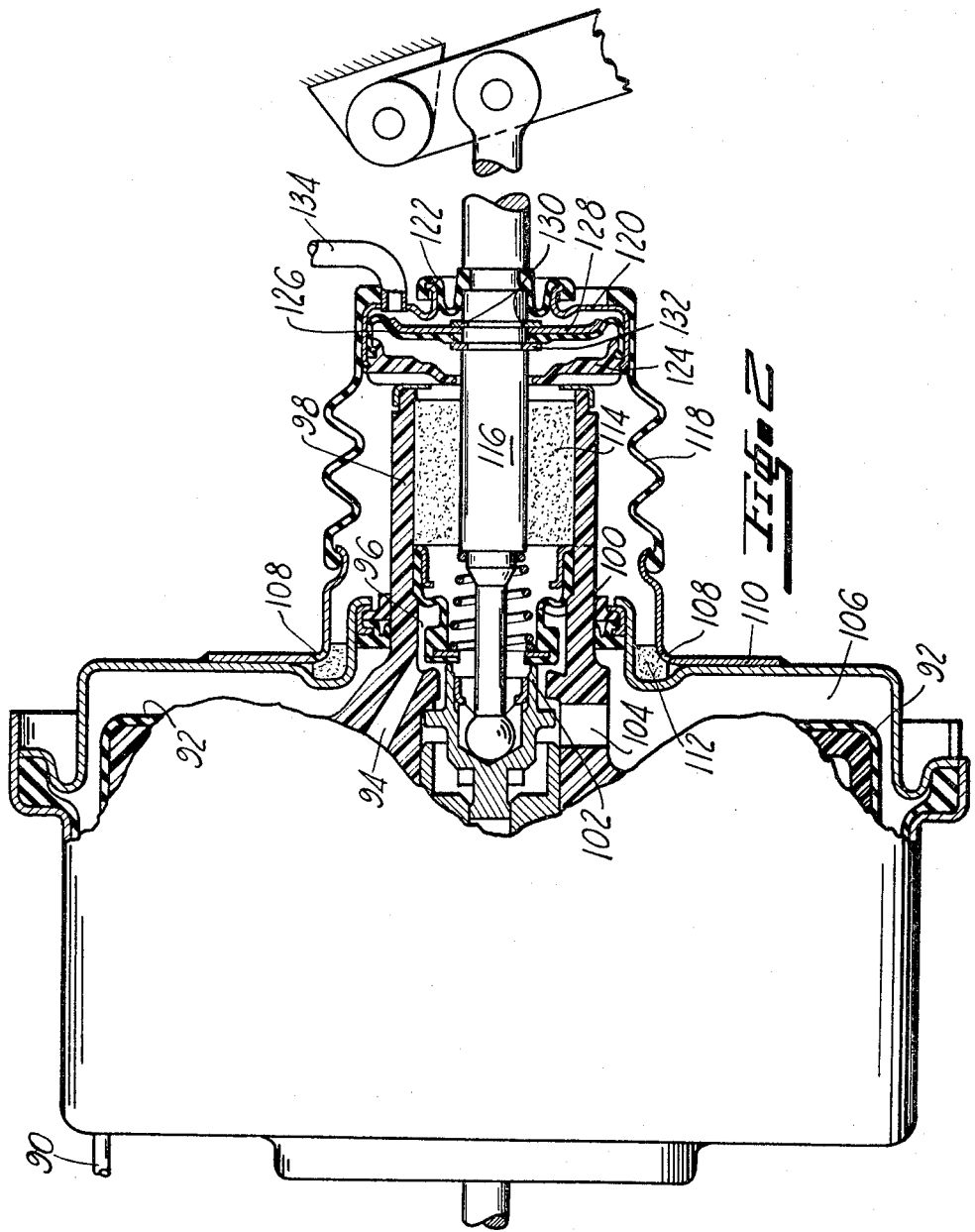
CHARLIE N. FRENCH
ROBERT R. HAGER
CHESTER A. MARTIN
INVENTORS
BY *Richard G. Seib*
ATTORNEY 3,382,957
Patented May 14, 1968

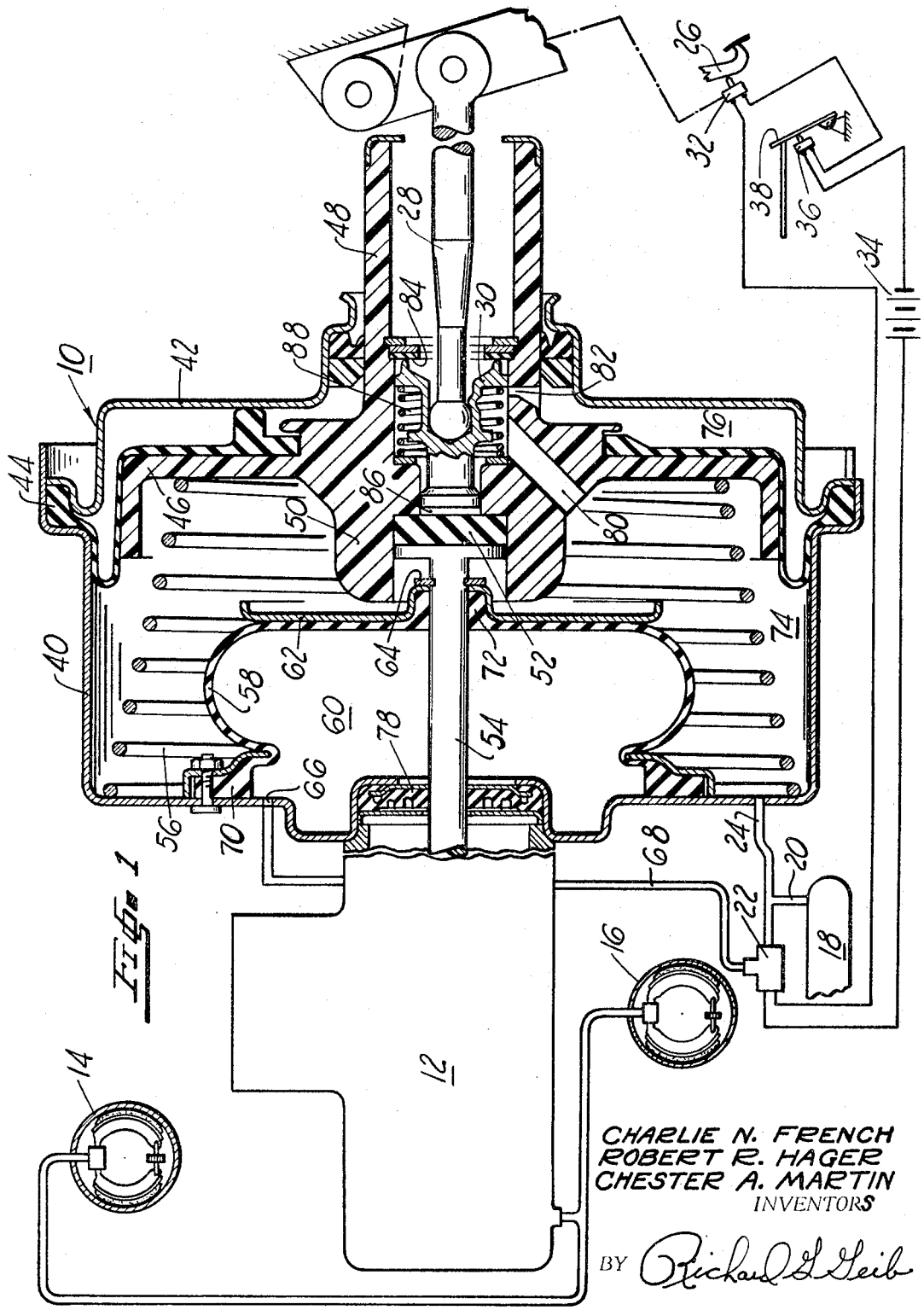

3,382,957
POWER BRAKE SERVOMOTOR
Charlie N. French, Robert R. Hager, and Chester A. Martin, South Bend, Ind., assignors to The Bendix Corporation, a corporation of Delaware
Filed Feb. 14, 1966, Ser. No. 527,253
5 Claims. (Cl. 192—3)

ABSTRACT OF THE DISCLOSURE

A pressure generating mechanism to increase force required to operate a servomotor for a braking system whenever an accelerator control is being actuated simultaneously with a brake control for the servomotor.

This invention relates to an improvement in a power brake servomotor. More particularly, the invention is concerned with means for increasing the force required to operate a power brake servomotor as long as simultaneous pressure is being exerted upon an accelerator pedal and a brake pedal in the associated vehicle.

It has been noted by several vehicle manufactures that operators of automobiles have been resting their left foot on the brake pedal while their right foot is on the accelerator pedal thus energizing the brakes at the same time they are accelerating the vehicle. This has in many instances decrease the service life of the brake linings thereby requiring increased maintenance cost to the owner of the vehicle.

It is a principal object of this invention to provide a means for increasing the force required to operate the brakes whenever simultaneous pressure is applied to an accelerator pedal and a brake pedal.

It is a further object of this invention to provide a means operatively connected to a power brake servomotor that will increase the force required to operate the servomotor during the application of simultaneous pressure to the accelerator pedal and the brake pedal.

It is a still further object of this invention to provide a pressure responsive means that is actuated by electrical switches responsive to travel and/or pressure upon the accelerator pedal and the brake pedal to increase the force required to operate a power brake servomotor and thereby actuate the brakes whenever simultaneous pressure is applied to the brake pedal and accelerator pedal.

These and other objects will be fully understood by those skilled in the art to which this invention relates from the following description of the appended figures in which:

FIGURE 1 shows a power brake servomotor system, whose servomotor is shown in cross section, that is operatively connected to an electrical circuit containing switches responsive to an accelerator pedal and a brake pedal of a vehicle; and FIGURE 2 is a partial cross sectional view of a modified form of a power brake servomotor incorporating the principles of the present invention for increasing the force required to operate the servomotor.

With particular regard to FIGURE 1, there is shown a power brake servomotor 10 for operating a master cylinder 12 that in turn actuates front wheel brakes 14 and rear wheel brakes 16. The servomotor is of a vacuum suspended type connected to an intake manifold 18 of the vehicle by a conduit 20 via a solenoid valve 22 and a further conduit 24. The servomotor 10 is normally actuated by means of a brake pedal 26 that is connected by means of a push rod 28 to a movable valve poppet and reaction plunger 30 within the servomotor.

The brake pedal is operatively connected to a position responsive switch 32 that is in series connection with a power source 34 via a position responsive switch 36 operatively connected to an accelerator pedal 38. This series circuit is completed by connecting the switch 32 to the solenoid 22 that is connected to the power source 34, as may be seen in FIGURE 1. The switches are of the normally open type in their installed condition and are closed by depressing either or both the accelerator 38 and the brake pedal 26. However, the circuit to the solenoid valve is not complete until both switches 32 and 36 are closed, such as when simultaneous pressure and/or travel is applied to the accelerator and brake pedal. It should be appreciated that the principles of the invention could also be obtained by using one switch on the accelerator pedal.

The servomotor includes a forward shell 40 and a rearward shell 42 that are joined together by a bayonet type connection with a bead 44 of a rolling diaphragm squeezed therebetween to seal the juncture of the shells. The rolling diaphragm is affixed to a plastic member 46 having a rearward hub projection 48 which slidably mounts the movable poppet and reaction member 30. In addition, a boss 50 is provided on the forward end of the member 46 to mount a reaction disc between the member 46 and a force transmitting rod 54 for the servomotor 10. The servomotor construction also includes a return spring 56 biased between the forward shell 40 and the member 46 so as to maintain the rolling diaphragm and member 46 in the rearward position shown by FIGURE 1, which is the released or nonactuated condition for the servomotor.

To the front shell 40 there is mounted a diaphragm 58 to create a variable volume chamber 60 within the front shell 40 ahead of the member 46. This diaphragm 58 is also mounted by means of a plate 62 and snap ring 64 to the force transmitting rod 54. A port 66 is provided in the forward shell 40 to communicate with the variable volume chamber 60, and this port is connected by means of a conduit 68 to the solenoid valve 22. It should be noted that the diaphragm 58 is provided with appropriate beaded portions 70 and 72 to maintain the variable volume chamber 60 sealed from a forward chamber 74 of the servomotor 10 that is separated from a rearward chamber 76 thereof by means of the rolling diaphragm and member 46.

As seen, the push rod 54 extends through the variable volume chamber 60 and projects exteriorly of the forward shell 40 of the servomotor through a seal structure 78 to abut upon a master cylinder piston (not shown) in the master cylinder 12.

The conduit 24 communicates with the variable volume chamber 74 and via passageways 80 and 82 to the variable volume chamber 76. Thus, the servomotor 10 is normally suspended in vacuum, and so long as the solenoid 22 is not actuated, the variable volume chamber 60 is communicated to the very same vacuum. Atmospheric pressure is introduced to the servomotor via the projection 48 whenever the brake pedal 26 is depressed to move the member 30 away from a valve seat 84 to a position where it lies between the passage 80 and the passage 82. In other words, as the brake pedal 26 is first depressed, it will move the member 30 to close off the passage 82 and thereafter translate the member 30 to open the passage 82 to the atmospheric pressure within the projection 48 so that a pressure differential is created across the rolling diaphragm and member 46. In assembling the servomotor there is normally required to be a space 86 between the forward end of the member 30 and the deformable reaction disc 52, which is maintained by a valve return spring, to allow the aforesaid movement of the member 30 to take place before contact is made with the disc 52. During this initial movement the only forces that must be overcome are that of the valve return spring 88 between the member 46 and the movable member 30.

The solenoid valve 22, as may be readily understood by those skilled in the art, is constructed so that vacuum communication from the intake manifold 18 is always present in the conduit 24 and it may be terminated to the conduit 68 to thereafter open atmospheric pressure to the conduit 68. It will be thus further realized that whenever atmospheric pressure exists in the conduits 68 the variable volume chamber 60 is pressurized so that a pressure differential is created across the diaphragm 58 that will tend to hold back the force transmitting rod 54. In other words, whenever the brake pedal 26 and the accelerator pedal 38 are simultaneously being depressed by the feet of the vehicle operator, the solenoid valve 22 is still scheduling a vacuum to the chamber 74 but has permitted atmospheric communication to the chamber 60. Furthermore, there is atmospheric pressure being communicated to the variable volume chamber 76 due to the pressure on the brake pedal translating the valve 30. However, no force is being exerted on the master cylinder piston by the force transmitting rod 54 nor can any be transmitted until the pressure differential across 46 overcomes that on the smaller diaphragm 58 or until manual effort assists the pressure differential across the rolling diaphragm and member 46 to translate the force transmitting rod 54.

With regard to the modified form of the invention shown by FIGURE 2, a servomotor is shown of the same general type as seen in FIGURE 1 with only a difference in the valving structure. In this form of the invention the operating characteristics of the servomotor are the same as for FIGURE 1 in that vacuum is supplied to the servomotor via a port 90 to the forward side of the movable wall 92, and communicated by means of the angular passage 94 to valve chamber 96 within the hub 98 of the wall 92. In the released position shown, the vacuum in the valve chamber 96 passes about the single piece movable poppet 100 and around the reaction plunger 102 to the radial passage 104 into the variable volume control chamber 106.

Atmospheric pressure, on the other hand, is introduced via a plurality of openings 108 in a boot retainer 110 to an annular filter 112 and thence around the end of the hub projection 98 to a filter 114 about a push rod 116 and into the hollow valve member 100.

The boot retainer mounts a flexible boot 118 that is constructed to extend beyond the rearward projection 98 of the wall 92 in the servomotor about a metal stamping 120 that is in turn sealingly connected by means of a rolling diaphragm 122 to the push rod 116. An annular plastic plate 124 is affixed to the stamping and mounts thereto a diaphragm 126 that is held to the push rod 116 by means of a backing plate 128 and a pair of snap rings 130 and 132. This diaphragm 126 is arranged to be open to the atmospheric pressure from the filter 112 on the forward side thereof and communicated to a controlled pressure via conduit 134 on the other side thereof. The port 90 and the conduit 134 are connected to a solenoid valve such as the solenoid valve 22 shown in FIGURE 1. However, in the modified form of the invention shown in this FIGURE 2, the conduit 134 is normally communicated to atmospheric pressure so that the diaphragm 126 is suspended.

In this type of installation, therefore, whenever simultaneous pressure is applied to the pedals 26 and 38, the solenoid valve 22 will terminate atmospheric communication to the conduit 134 and open vacuum communication from the intake manifold 18 thereto so that a pressure differential is created across the diaphragm 126 and the stamping 120 and seal 122. As the plate 124 bears by ribs on the projection 98, the differential across diaphragm 126 will have to be overcome by the manual effort on the brake pedal 26 before the valve plunger 102 can be translated to terminate vacuum suspension of the servomotor and permit atmospheric pressure to enter the control chamber 106.

Having fully described the manner of construction of servomotors embodying the principles of the invention, there is now appended a set of claims to set forth the intended protection sought by these Letters Patent.

We claim:
1. In a vehicle power brake means having a housing, a movable wall in said housing, and a valve means controlled by a push rod connected to a vehicle brake pedal with the valve means being operatively connected to the movable wall so that failure of power will permit the push rod to manually translate the wall, a means to increase manual effort required to operate the power brake whenever simultaneous pressure is applied to an accelerator and the brake pedal in the vehicle, said means comprising:
   an electrical system responsive to a control means such as an accelerator;
   a solenoid valve means operatively connected to the electrical system;
   a pressure responsive means operatively connected to said valve means and the power brake means, said pressure responsive means including a diaphragm of lesser effective area than the movable wall of the power brake means and arranged so that as said solenoid valve schedules a pressure differential thereacross the diaphragm will react oppositely of the forces of the pressure differential across the movable wall of the power brake means to increase the effort required to operate the power brake means, said diaphragm being connected to the housing of the power brake means and the force transmitting rod to create a sealed chamber in the housing ahead of the movable wall, said sealed chamber being controlled by said solenoid valve means.

2. In a vehicle power brake means, a means to increase manual effort required to operate the power brake whenever simultaneous pressure is applied to an accelerator and a brake pedal in the vehicle, said means comprising:
   an electrical system responsive to a control means such as an accelerator and a brake pedal by including an electrical source and a series system of switches, one responsive to brake pedal position and another responsive to accelerator pedal position;
   a solenoid valve means operatively connected to the electrical system via said series system of switches;
   a pressure responsive means operatively connected to said valve means and the power brake means, said pressure responsive means including a diaphragm of lesser effective area than the wall of the power brake means arranged so that as said solenoid valve schedules a pressure differential thereacross, the diaphragm will react oppositely of the force caused by a pressure differential across the movable wall of the power brake means to increase the effort required to operate said power brake means.

3. A means according to claim 2 wherein said movable wall may be characterized as including a hub portion mounting a power brake valve and a push rod operatively connected to the power brake valve to be relatively movable therewithin, with a rearward projection protruding through said housing;
   a flexible boot about said projection connected at its forward end to said housing, a means within said boot between it and said hub portion providing a chamber in said location, said diaphragm dividing said chamber into a first variable volume chamber and a second variable volume chamber, a means to communicate said first variable volume chamber to said solenoid valve means and said second variable volume chamber to a fluid pressure source for operating said pressure responsive means.

4. A means according to claim 3 wherein said means providing a chamber includes a centrally apertured partition, a stamped shell connected to said partition, said shell having a central opening and clamping said diaphragm to said partition to operate therewithin, and a seal means joining the shell to said push rod in the opening through the shell.

5. A means according to claim 4 wherein said partition includes ribs for abutting on said hub projection to position said chamber to the rear thereof, said ribs permitting communication of the fluid pressure source operating said pressure responsive means to said chamber.

References Cited

UNITED STATES PATENTS 2,973,844  3/1941  Prather _____ 192—3

DONLEY J. STOCKING, *Primary Examiner.*

ARTHUR T. McKEON, *Examiner.*